Dec. 7, 1926.
E. W. DAVIS
1,609,864
LUBRICATING SYSTEM
Filed Dec. 20, 1923
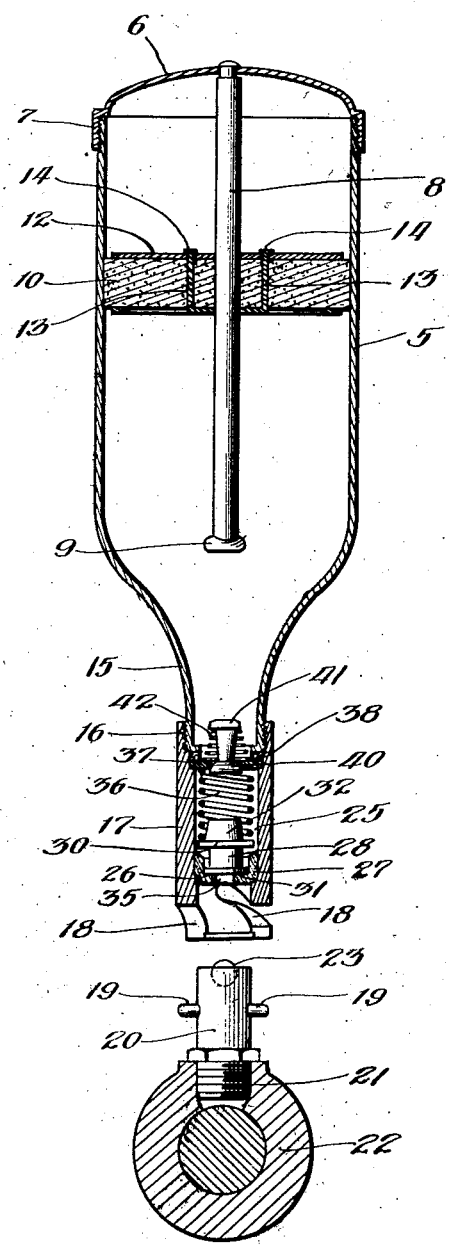
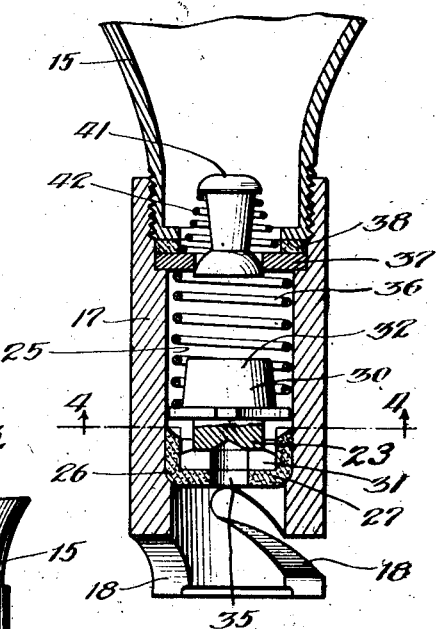
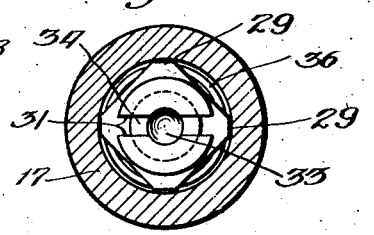
Inventor
Ernest W. Davis
Williams, Bradbury,
McCaleb + Pierce
Attys.

Patented Dec. 7, 1926.

1,609,864

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed December 20, 1923. Serial No. 681,715.

My invention relates to improvements in lubricating systems, and is particularly concerned with improvements in that type of lubricating system comprising a plurality of fittings, each of which is adapted to be secured to a bearing of the mechanism to be lubricated, and a compressor for supplying lubricant under pressure to the fittings, the compressor being provided with means for successively effecting sealed connection with the several fittings.

The objects of my present invention are:

First, to provide a lubricating system of the character described, by means of which lubricant can be easily and quickly forced into the fittings under high pressure;

Second, to provide a lubricating system of the character described, in which the pressure upon the lubricant is developed by a movement of the compressor relative to the fitting;

Third, to provide a lubricating system of the character described, in which the compressor and the fittings have co-acting parts for placing the lubricant supplied to the fittings under pressure;

Fourth, to provide a system such as described above, comprising a sealing element for effecting a sealed connection between the compressor and the various fittings, the sealing device also acting as a plunger for placing the lubricant under pressure;

Fifth, to provide a lubricant compressor, comprising a reservoir and a cylinder communicating therewith, and means movable in the cylinder and capable of producing a vacuum in said cylinder for automatically withdrawing the lubricant from the reservoir or supply chamber, and thus priming the high pressure cylinder; and Sixth, to provide a lubricating system of the character described, which is simple in construction, economical to manufacture, and easy to operate.

Other objects of my invention will appear as this description progresses, reference being had to the accompanying drawings, in which—

Figure 1 is a central longitudinal section through the compressor forming a part of my improved lubricating system, the fitting forming a part of such system being shown in elevation;

Figure 2 is a central longitudinal section through the coupling and high pressure cylinder of my improved compressor, this view being on a larger scale than Figure 1;

Figure 3 is a side elevation of the coupling member and high pressure cylinder intended to show the shape of the entry portion of the bayonet slots; and Figure 4 is a transverse section taken on line 4—4 of Figure 2.

Throughout the several views similar reference characters will be used for referring to similar parts.

The improved compressor of my novel lubricating system comprises a lubricant reservoir or supply chamber formed of the low pressure barrel or cylinder 5, the larger end of which is provided with a closure 6 which is connected with the open end of the barrel by means of a screw threaded connection 7. This closure is provided with an inwardly extending guide rod 8 terminating in the stop member 9 which is formed by flattening the inner end of the guide rod 8. Freely slidable upon the guide rod 8 is a plunger or follower comprising the felt disc 10, the face plate 11, and the follower plate 12. Tongues 13 are struck from the face plate 11 and bent at an angle thereto. The free ends of these tongues pass through suitably shaped slots in the follower plate 12 and are riveted over as shown at 14 to provide a substantially air tight connection between the follower plate 12 and the struck up portions or tongues 13. While my improved compressor will operate without the plunger just described being present, its operation is more satisfactory when such plunger is used.

The end of the barrel 5 opposite the cap 6 is tapered down to a neck 15 which terminates in a screw threaded portion 16, upon which is threaded the inner end of the coupling sleeve or member 17. The outer end of this coupling sleeve or member is provided with a pair of oppositely disposed bayonet slots 18 for receiving the projections 19 extending from the sides of the fitting 20. This fitting is provided with a screw threaded end 21 adapted to be screwed into a journal 22, and is also provide with a closure 23 which is yieldingly held in place by means of a spring not shown. The fitting just described is a well known article of commerce, and further description thereof appears to be unnecessary.

I have found that very good results are obtained when the angle $a$, that is the angle between the sides of the bayonet slots 18 and the plane defining the outer end of the coupling member 17, is approximately 20°, and also that it is better to make the entry portions 24 of the slots substantially parallel with the axis of the compressor so as to prevent the bending or breaking off of the points which would otherwise be formed by continuing the outer sides of the slots until they meet the end of the coupling member. It is also desirable to make the slots 18 somewhat wider than the diameter of the pins or projections 19.

The inner portion of the bore 25 of the coupling member is larger in diameter than the outer portion to form an annular seat 26 for limiting the outward movement of the cup leather 27 which is slidably mounted in the inner portion of the bore of the coupling member 17. For yieldingly holding the cup leather 27 in its outermost position, I provide a follower 28 which is preferably formed from square stock, the corners of which are rounded as shown at 29 (see Fig. 4) before it is machined to form the spaced flanges 30 and 31, the intermediate cylindrical portion, and the inwardly extending boss 32. The outer end of this follower is drilled as shown at 33, and a slot 34 is then milled in the outer end so as to establish communication between the bore of the coupling member 17 and the opening 35 in the cup leather 27. The compression spring 36 is confined between the flange 30 of the follower and the metal washer 37 which is clamped between the shoulder on the coupling member 17 and the end of the neck portion 15 of the barrel 5. I prefer to seal this connection by means of a fibre washer 38.

The metal washer 37 forms a seat for the valve 40, the stem of which extends through the washer 37 and terminates in an enlargement or stop member 41 which is just small enough to pass through the opening in the washer 37. A comparatively light compression spring 42 positioned between the metal washer 37 and the enlargement 41 provides means for yieldingly urging the valve 40 to its closed position.

In the use of my improved lubricating system, the cap 6 is removed from the barrel 5. As the rod 8 is withdrawn, the head 9 engages the inner face of the plunger and enables the operator in this manner to withdraw the plunger from the barrel 5. The barrel 5 is then substantially filled with lubricant, preferably grease, and the piston, rod and cap are then replaced, thus leaving the piston positioned at the outer end of the barrel 5. The operator then grasps the outer end of the barrel 5 in one hand and brings the coupling member 17 in such a position relatively to the fitting 20 that the projections 19 are received in the initial portions 24 of the bayonet slots. A slight pressure upon the cap 6 in the direction of the fitting will be sufficient to bring the projections 19 into line with the inclined portions of the slots 18. The operator thereupon rotates the barrel 5 in the proper direction to cause the slots 18 to ride over the pins or projections 19. This causes the coupling 17 to move downwardly over the fitting 20. The dimensions of the co-acting portions of the coupling member 17 and the fitting 20 are such that the initial movement of the coupling member 17 causing the pins to pass through the initial portions 24 of the slots 18, brings the outer end of the fitting 20 into contact with the cup leather 27 so as to establish a sealed connection between the compressor and the fitting. The rotary movement of the barrel 5 causing the coupling 17 to move downwardly over the fitting 20, causes the cup leather 27 to be forced inwardly in the coupling member 17. When the barrel has been turned so that further rotation thereof is prevented by the engagement of the pins or projections 19 with the inner ends of the slots 18, the operator reverses the direction of rotation, thereby bringing the pins or projections 19 back to the initial portions of the slots 18. By continuing the oscillatory movement of the barrel 5 the operator can cause repeated reciprocation of the cup leather 27 in the bore of the coupling member 17. Each time this cup leather moves outwardly under the influence of the spring 36, a vacuum is created in the bore of the coupling member 17 which causes lubricant to be sucked into this bore past the valve 40, and each time the cup leather 27 is moved in the opposite direction the contents of the bore of the coupling member 17 are placed under pressure. The valve 40 closes upon the initial portion of the inward movement of the cup leather 27, and thereby prevents the return of the lubricant from the coupling member 17 to the barrel 5, and further inward movement of the cup leather causes the lubricant in the coupling member 17 to be placed under pressure which can easily be made sufficiently great to cause the lubricant to be forced through the fitting 20 and into the bearing 22, and thereby displace the used lubricant from this bearing. By continuing the oscillations of the barrel 5 a comparatively large quantity of lubricant can be discharged under high pressure in a very short time.

The outer end of the rod 8 is loosely riveted to the cap 6 so as to permit access of air to the outer end of the barrel 5 to replace the lubricant as it is withdrawn from this barrel. It will, of course, be understood that the piston in the barrel 5 moves inwardly under atmospheric pressure thus created in the outer end of the barrel 5.

It will, of course, be understood that when one fitting has received a sufficient quantity of lubricant the compressor can be removed from it and transferred to the next fitting and this operation repeated until all of the fittings of a given mechanism have been supplied with lubricant. It will, of course, be understood that if desired, the barrels 5 can be made articles of commerce and sold filled with grease so that all that it is necessary for the operator to do is to connect this barrel or container with the coupling member 17 and then proceed as outlined above.

While I have described the preferred embodiment of my invention, it is to be clearly understood that my invention is not limited to these details but is capable of other adaptations and modifications in the scope of the appended claims.

Having thus described my invention, what I claim is:

1. A lubricating system comprising the combination with a fitting having projections extending from opposite sides thereof, of a compressor comprising a barrel having a cap at one end provided with an inwardly extending guide rod, a piston slidably mounted upon said guide rod, a coupling member rigidly secured to the opposite end of said barrel, said coupling member having oppositely disposed inclined cam slots extending inwardly from its outer end, and a bore forming a high pressure cylinder, a cup leather slidably mounted in said bore, means for yieldingly urging said cup leather outwardly, an outwardly opening check valve located between said bore and said barrel, means for yieldingly holding said check valve in its closed position, said fitting having a check valve opening into said fitting, said cup leather having a continuously open discharge passage-way therethrough.

2. A lubricating system comprising a fitting having a projection extending from one side thereof, and a compressor comprising a barrel having a piston slidably mounted therein, a coupling member rigidly secured to one end of said barrel, said coupling member having a bore communicating with said barrel and a cam slot extending inwardly from its outer end, an apertured piston slidably mounted in said bore, the outer face of said piston being adapted to make sealed contact with the free end of said fitting, means for yieldingly holding said piston in its outermost position, and means for preventing the return flow of lubricant from said bore to said barrel, said piston aperture being open and unobstructed.

3. The combination with a receiving fitting, of a compressor comprising a lubricant containing barrel, a cylinder receiving lubricant from said barrel and telescoping over said fitting, means for maintaining a seal between the side wall of said cylinder and the end of said fitting during relative axial movement of said cylinder and fitting, a first check valve between said barrel and cylinder and a second check valve in the end of said fitting, the passage between said valves being unobstructed, whereby said fitting operates during inward telescoping movement to compress and expel lubricant trapped by said first mentioned check valve, and during outward movement to suck more lubricant into said cylinder.

4. A lubricant compressor comprising a barrel, a coupling cylinder communicating with said barrel, a check valve between said barrel and said cylinder, a piston slidable in said cylinder and having an unobstructed outlet passage, means for resiliently holding said piston near the outer end of said cylinder, and means for drawing the end of a tubular receiving fitting into said cylinder to move said piston away from the end of said cylinder, said piston including means for establishing a contact seal with the end of said fitting.

5. A lubricating system comprising a barrel, a cylinder communicating with said barrel, a check valve between said barrel and said cylinder, a piston slidable in said cylinder and having an unobstructed outlet passage, means for resiliently holding said piston near the outer end of said cylinder, and a tubular receiving fitting adapted to enter said cylinder and push said piston away from the end of said cylinder, said fitting and piston including means for maintaining a seal during movement of the piston.

6. A lubricating system comprising the combination with a fitting having projections extending from opposite sides thereof, of a compressor comprising a barrel having a cap at one end provided with an inwardly extending guide rod, a piston slidably mounted upon said guide rod, a coupling member rigidly secured to the opposite end of said barrel, said coupling member having oppositely disposed inclined cam slots extending inwardly from its outer end, and a bore forming a high pressure cylinder, a cup leather slidably mounted in said bore, means for yieldingly urging said cup leather outwardly, an outwardly opening check valve located between said bore and said barrel, and means for yieldingly holding said check valve in its closed position.

7. A lubricating system comprising a fitting having a projection extending from one side thereof, and a compressor comprising a barrel having a piston slidably mounted therein, a coupling member rigidly secured to one end of said barrel, said coupling member having a bore communicating with said barrel and a cam slot extending inwardly from its outer end, an apertured piston slidably mounted in said bore, the outer face of said piston being adapted to make sealed contact with the free end of said fitting, means for yieldingly holding said piston in its outermost position, and means for preventing the return flow of lubricant from said bore to said barrel.

8. A lubricating system comprising a fitting and a compressor for supplying lubricant thereto, said compressor comprising a barrel and a high pressure cylinder communicating with said barrel, a piston slidably mounted in said high pressure cylinder, and co-acting means on said high pressure cylinder and said fitting for reciprocating said piston by oscillating said barrel about its axis relatively to said fitting.

9. A lubricating system comprising a fitting and a compressor for supplying lubricant thereto, said compressor comprising a barrel and a high pressure cylinder communicating with said barrel, a piston slidably mounted in said high pressure cylinder, and co-acting means on said high pressure cylinder and said fitting for reciprocating said piston by oscillating said barrel relatively to said fitting.

10. A lubricant compressor comprising a lubricant reservoir, a cylinder communicating with said reservoir, an outwardly opening spring pressed valve controlling communication between said reservoir and said cylinder, a gasket slidably mounted in the outer end of said cylinder, and a cam on said cylinder for co-acting with means for reciprocating said gasket.

11. The combination with a fitting, of means for supplying lubricant thereto, comprising a compressor having a cylinder, a piston slidable therein, and co-acting means on said fitting and cylinder for actuating said piston when said cylinder is moved relatively to said fitting.

12. The combination with a fitting, of means for supplying lubricant thereto, comprising a compressor having a cylinder, a piston slidable therein, and co-acting means on said fitting and cylinder for actuating said piston when said cylinder is moved relatively to said fitting, one side of said piston having means for making sealed contact with said fitting.

13. The combination with a fitting, of a compressor, said compressor and fitting comprising co-acting means for placing the lubricant in said compressor under pressure by moving said compressor relatively to said fitting, said co-acting means including means for effecting a sealed connection between said compressor and said fitting.

14. The combination with a fitting having a projection extending from one side thereof, of a compressor for supplying lubricant thereto, said compressor comprising a cylinder, means for supplying lubricant to said cylinder, an outwardly opening check valve between said last named means and said cylinder, a piston slidable in said cylinder, and means on said compressor for co-acting with said projection to reciprocate said piston, upon oscillation of said cylinder.

15. The combination with a fitting having a projection extending from one side thereof, of a compressor for supplying lubricant thereto, said compressor comprising a cylinder having an open end for receiving said fitting, a piston slidable in said cylinder, and means for co-acting with said projection to reciprocate said piston, one side of said piston comprising means for making sealed contact with said fitting.

16. The combination with a fitting, of a compressor, said compressor and fitting comprising co-acting means for placing lubricant in said compressor under pressure by oscillating said compressor relatively to said fitting.

17. A lubricating system comprising the combination with a fitting having projections extending from opposite sides thereof, of a compressor comprising a barrel having a cap at one end provided with an inwardly extending guide rod, a piston slidably mounted upon said guide rod, a coupling member rigidly secured to the opposite end of said barrel, said coupling member having oppositely disposed inclined cam slots extending inwardly from its outer end, and a bore forming a high pressure cylinder, a cup leather slidably mounted in said bore, means for yieldingly urging said cup leather outwardly, an outwardly opening check valve located between said bore and said barrel, and means for yieldingly holding said check valve in its closed position.

18. A lubricating system comprising a fitting having a projection extending from one side thereof, and a compressor comprising a barrel having a piston slidably mounted therein, a coupling member rigidly secured to one end of said barrel, said coupling member having a bore communicating with said barrel and a cam slot extending inwardly from its outer end, an apertured piston slidably mounted in said bore, the outer face of said piston being adapted to make sealed contact with the free end of said fitting, means for yieldingly holding said piston in its outermost position, and means for preventing the return flow of lubricant from said bore to said barrel.

19. The combination with a fitting, of a compressor, said compressor and fitting having quick detachable co-acting means for placing the lubricant in said compressor under pressure by rotating said compressor relatively to said fitting.

20. The combination with a fitting, of a compressor having a sleeve for telescoping removably over said fitting, and compressing mechanism in said compressor operated by telescoping said sleeve over said fitting.

21. The combination with a fitting, of a compressor having a lubricant containing barrel, said compressor and fitting comprising co-acting quick detachable means for placing the lubricant in said compressor under pressure by rotating said barrel relatively to said fitting.

22. The combination with a receiving fitting, of a compressor comprising a lubricant containing barrel, a cylinder receiving lubricant from said barrel and telescoping over said fitting, means for maintaining a seal between the side wall of said cylinder and the end of said cylinder during relative axial movement of said cylinder and fitting, and a check valve between said barrel and cylinder, whereby during inward telescoping movement said fitting operates as a piston to compress and expel lubricant trapped by said check valve.

23. The combination with a fitting having cam surfaces, of a compressor comprising a barrel, a cylinder secured to said barrel and communicating therewith, the outer end of said cylinder being provided with cam surfaces for coacting with the cam surfaces on said fitting, a cup leather slidable in said cylinder, a displacer having one end extending into said cup leather, a spring for urging said cup leather outwardly, and an outwardly opening valve between said barrel and said cylinder.

24. The combination with a fitting having cam surfaces, of a compressor comprising a barrel, a cylinder secured to said barrel and communicating therewith, said fitting and the outer end of said cylinder being provided with coacting means for advancing said cylinder on to said fitting when said cylinder is rotated relatively to said fitting, a piston slidable in said cylinder, and an outwardly opening valve between said barrel and said cylinder.

25. The combination with a fitting having a cam surface, of a detachable compressor having a cam surface for co-acting with the cam surface on said fitting, and means actuated by said co-acting cam surfaces for placing lubricant in said compressor under pressure.

26. A lubricating system comprising a fitting permanently mounted on a device to be lubricated, a portable compressor comprising an open ended compression cylinder, means for forcing said cylinder over said fitting to compress the lubricant, and annular sealing means in said cylinder riding on the end of said fitting to form with said fitting a tightly sealed plunger piston.

27. The combination with a fitting, of a compressor comprising a cylinder for telescoping over said fitting and a reservoir back of said cylinder, means actuated by relative twisting movement of said fitting and cylinder for compressing lubricant in said cylinder and forcing it into said fitting, and check valve means for protecting said reservoir from the pressure in said cylinder.

28. The combination with a fitting, of a compressor comprising a cylinder for engaging said fitting and a reservoir back of said cylinder, means actuated by relative twisting movement of said fitting and cylinder for compressing lubricant in said cylinder and forcing it into said fitting, and check valve means for protecting said reservoir from the pressure in said cylinder.

29. The combination with a fitting, of a compressor comprising a cylinder for engaging said fitting and a reservoir back of said cylinder, means actuated by relative twisting movement of said fitting and cylinder for compressing lubricant in said cylinder and forcing it into said fitting, and means for protecting said reservoir from the pressure in said cylinder.

In witness whereof, I hereunto subscribe my name this 13th day of December, 1923.

ERNEST W. DAVIS.